United States Patent
Park et al.

(10) Patent No.: US 12,450,807 B2
(45) Date of Patent: Oct. 21, 2025

(54) OBJECT SYNCHRONIZATION APPARATUS AND METHOD

(71) Applicants: HYUNDAI MOTOR COMPANY, Seoul (KR); KIA CORPORATION, Seoul (KR); SUNGSHIN WOMEN'S UNIVERSITY INDUSTRY-ACADEMIC COOPERATION FOUNDATION, Seoul (KR)

(72) Inventors: Ju Hee Park, Suwon-si (KR); Soo Min Shim, Yongin-si (KR); Jeong Min Oh, Seoul (KR); Bo Kyung Kim, Daejeon (KR); Seong Wook Hwang, Seoul (KR); Joon Young Kim, Seoul (KR)

(73) Assignees: HYUNDAI MOTOR COMPANY, Seoul (KR); KIA CORPORATION, Seoul (KR); SUNGSHIN WOMEN'S UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 219 days.

(21) Appl. No.: 18/519,997

(22) Filed: Nov. 27, 2023

(65) Prior Publication Data
US 2025/0029304 A1    Jan. 23, 2025

(30) Foreign Application Priority Data
Jul. 18, 2023    (KR) ........................ 10-2023-0093163

(51) Int. Cl.
*G06T 19/00* (2011.01)
*G05B 17/02* (2006.01)
(Continued)

(52) U.S. Cl.
CPC .............. *G06T 13/20* (2013.01); *G05B 17/02* (2013.01); *G06T 7/20* (2013.01); *G06T 19/006* (2013.01);
(Continued)

(58) Field of Classification Search
None
See application file for complete search history.

(56) References Cited

U.S. PATENT DOCUMENTS

| 9,058,681 B2 * | 6/2015 | Troy ...................... G06T 19/20 |
| 11,422,841 B2 | 8/2022 | Jeong |

(Continued)

FOREIGN PATENT DOCUMENTS

| KR | 101323148 B1 | 10/2013 |
| KR | 20190120981 A | 10/2019 |

(Continued)

OTHER PUBLICATIONS

Simiscuka et al. Real-Virtual World Device Synchronization in a Cloud-Enabled Social Virtual Reality IoT Network, Aug. 5, 2019, vol. 7, 106588-106599 (Year: 2019).*

*Primary Examiner* — Robert J Craddock
(74) *Attorney, Agent, or Firm* — Lempia Summerfield Katz LLC

(57) ABSTRACT

An object synchronization apparatus includes a memory storing computer-executable instructions and at least one processor that accesses the memory and executes the instructions. The at least one processor: creates a virtual object corresponding to a source code of a user in a virtual space, in response to a compiling request based on the source code; performs verification for the created virtual object; performs synchronization between the verified virtual object and a real object, in response to a control request for the verified virtual object; and creates a sub-virtual (Continued)

object corresponding to a detected target object in the virtual space when the synchronized real object detects the target object.

20 Claims, 10 Drawing Sheets

(51) Int. Cl.
  *G06T 7/20* (2017.01)
  *G06T 13/20* (2011.01)
(52) U.S. Cl.
  CPC .... *G06T 2200/16* (2013.01); *G06T 2219/024* (2013.01)

(56) References Cited

U.S. PATENT DOCUMENTS

| | | |
|---|---|---|
| 2017/0316714 A1 | 11/2017 | Lau |
| 2019/0317793 A1 | 10/2019 | Jeong |
| 2019/0375096 A1 | 12/2019 | Gupta et al. |
| 2022/0230558 A1 | 7/2022 | Sim |
| 2022/0375363 A1 | 11/2022 | Watanabe et al. |
| 2023/0394759 A1* | 12/2023 | Aoki ................. A63F 13/31 |

FOREIGN PATENT DOCUMENTS

| | | |
|---|---|---|
| KR | 102195396 B1 | 12/2020 |
| KR | 20220047149 A | 4/2022 |

* cited by examiner

OBJECT SYNCHRONIZATION APPARATUS AND METHOD

CROSS-REFERENCE TO RELATED APPLICATION

This application claims the benefit of priority to Korean Patent Application No. 10-2023-0093163, filed in the Korean Intellectual Property Office on Jul. 18, 2023, the entire contents of which are incorporated herein by reference.

TECHNICAL FIELD

The present disclosure to an object relates synchronization apparatus and a method thereof, and more particularly, relates to technologies for allowing a plurality of students to participate in robot coding education at the same time using a metaverse space.

BACKGROUND

Coding is the process of creating a code which is the language of a program for performing a specific purpose. Because coding encourages creativity, coding education has increased in elementary and secondary schools. Furthermore, recently, as coding education has been determined as essential education in the elementary and secondary schools, coding education for students has increased.

However, in the process of applying a source code for controlling a robot to the robot, the number of students should be identical to the number of robots. This still has a difficulty for students to obtain a source code for controlling a robot. There is a need to develop a technology for addressing this issue.

SUMMARY

The present disclosure has been made to solve the above-mentioned problems occurring in the prior art while advantages achieved by the prior art are maintained intact.

An aspect of the present disclosure provides an object synchronization apparatus for creating a virtual object corresponding to a source code of a user in a virtual space, in response to a compiling request based on the source code and performing verification for the created virtual object. Another aspect of the present disclosure provides a method thereof.

Another aspect of the present disclosure provides an object synchronization apparatus for performing synchronization between a verified virtual object and a real object, in response to a control request for the verified virtual object. Another aspect of the present disclosure provides a method thereof.

A further aspect of the present disclosure provides an object synchronization apparatus for tracking the state of a detected target object when the synchronized real object detects the target object and for updating the state of the detected target object to perform synchronization between the updated target object and a sub-virtual object. Yet another aspect of the present disclosure provides a method thereof.

The technical problems to be solved by the present disclosure are not limited to the aforementioned problems. Any other technical problems not mentioned herein should be more clearly understood from the following description by those of ordinary skill in the art to which the present disclosure pertains.

According to an aspect of the present disclosure, an object synchronization apparatus may include a memory storing computer-executable instructions and at least one processor that accesses the memory and executes the instructions. The at least one processor may: create a virtual object corresponding to a source code of a user in a virtual space, in response to a compiling request based on the source code; perform verification for the created virtual object; perform synchronization between the verified virtual object and a real object, in response to a control request for the verified virtual object; and create a sub-virtual object corresponding to a detected target object in the virtual space when the synchronized real object detects the target object.

In an embodiment, the at least one processor may provide the user with a development environment for a virtual object to be created in the virtual space and may create the virtual object corresponding to the source code input to the development environment by the user.

In an embodiment, the at least one processor may: provide each of a plurality of users with an independent development environment and an independent virtual space when the user is plural in number; create a virtual object corresponding to a source code of a first user among the plurality of users in an independent virtual space of the first user; and create a virtual object corresponding to a source code of a second user different from the first user among the plurality of users in an independent virtual space of the second user.

In an embodiment, the at least one processor may perform software verification for a plurality of call functions included in the source code, may perform verification for a movement and an action of the virtual object in the virtual space, and may perform verification for compatibility of hardware components. The compatibility may be associated with a movement and an action of the real object to be synchronized with the virtual object.

In an embodiment, the at least one processor may perform verification for at least one of a movement in a first direction of the virtual object in the virtual space, a movement in a second direction different from the first direction, or an angle between the first direction and the second direction; or any combination thereof.

In an embodiment, the at least one processor may perform a second verification different from a first verification including the software verification, verification for the movement, and verification for the action when the first verification is performed. The second verification may include verification for compatibility of hardware components, the compatibility being associated with at least one of the power consumption of the real object, allocated amounts of a central processing unit (CPU) and a memory, or an amount of movement corresponding to the movement, or any combination thereof.

In an embodiment, the at least one processor may: change the virtual object to a control mode, in response to a control request of the user; create a control command protocol capable of controlling the real object, depending on a control command for the virtual object of the user; perform p the synchronization by applying the control command protocol to the real object; and provide the user with a control approval notification for the control request when the synchronization is performed.

In an embodiment, the at least one processor may set a control request of the second user to a waiting mode, when there is a control request for a virtual object of the second user while changing a virtual object of the first user to a control mode in response to a control request for the virtual object of the first user. The at least one processor may change the virtual object of the second user to the control mode, after changing the virtual object of the first user to the control mode.

In an embodiment, the at least one processor may perform verification for a movement and an action of the sub-virtual object, based on the detected target object is a robot object different from the real object.

In an embodiment, the at least one processor may track a state of the detected target object and may perform synchronization between an updated target object and the sub-virtual object, based on the state of the detected target object is updated.

BRIEF DESCRIPTION OF THE DRAWINGS

The above and other objects, features and advantages of the present disclosure should be more apparent from the following detailed description taken in conjunction with the accompanying drawings.

Figure 1:
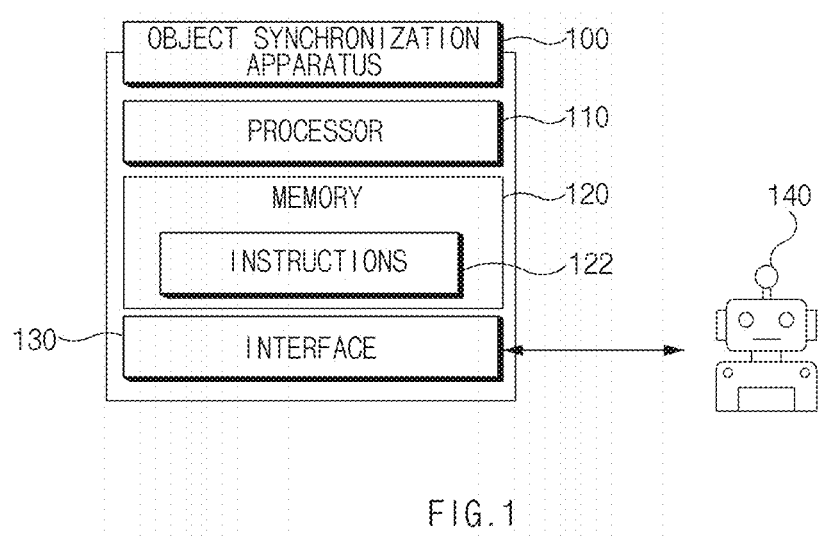
FIG. 1 is a drawing illustrating an object synchronization apparatus according to an embodiment of the present disclosure.

With regard to the description of the drawings, the same or similar denotations may be used for the same or similar components.

DETAILED DESCRIPTION

Hereinafter, some embodiments of the present disclosure are described in detail with reference to the drawings. In the drawings, the same reference numerals are used throughout to designate the same or equivalent components. In addition, a detailed description of well-known features or functions has been omitted in order not to unnecessarily obscure the gist of the present disclosure. Hereinafter, various embodiments of the present disclosure may be described with reference to the accompanying drawings. However, it should be understood that this is not intended to limit the present disclosure to specific implementation forms. The present disclosure includes various modifications, equivalents, and/or alternatives of embodiments of the present disclosure.

The terms, such as "first", "second", "1st", "2nd", A, B, (a), (b), or the like used in the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude the presence of additional features.

It should be understood that when a component (e.g., a component) is referred to as being "(operatively or communicatively) coupled with/to" or "connected to" another component (e.g., a second component), the component can be directly coupled with/to or connected to the other component or an intervening component (e.g., a third component) may be present. In contrast, when a component (e.g., a first component) is referred to as being "directly coupled with/to" or "directly connected to" another component (e.g., a second component), the component should be understood that there is no intervening component (e.g., a third component).

According to the situation, the expression "configured to" used in the present disclosure may be used exchangeably with, for example, the expression "suitable for", "having the capacity to", "designed to", "adapted to", "made to", or "capable of". When a component, device, element, or the like, of the present disclosure, is described as having a purpose or performing an operation, function, or the like, the component, device, or element should be considered herein as being "configured to" meet that purpose or to perform that operation or function.

The term "configured to" does not only mean "specifically designed to" when referring to hardware. For example, a "processor configured to perform A, B, and C" may mean a generic-purpose processor (e.g., a central processing unit (CPU) or an application processor) that may perform corresponding operations by executing one or more software programs that store a dedicated processor (e.g., an embedded processor) for performing a corresponding operation or a memory device. The terms of a singular form may include plural forms unless the context clearly indicates otherwise. All the terms used herein, which include technical or scientific terms, may have the same meaning that is generally understood by a person of ordinary skill in the art described in the present disclosure. It should be further understood that terms, which are defined in a dictionary and commonly used, should also be interpreted as is customary in the relevant related art and not in an idealized or overly formal detect unless expressly so defined herein in various embodiments of the present disclosure. In some cases, even though terms are terms that are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the cases (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

Hereinafter, embodiments of the present disclosure are described in detail with reference to FIGS. 1-10.

FIG. 1 is a drawing illustrating an object synchronization apparatus according to an embodiment of the present disclosure.

An object synchronization apparatus 100 according to an embodiment may include a processor 110, a memory 120 storing instructions 122, and an interface 130.

The object synchronization apparatus 100 may indicate a real-time object synchronization apparatus that creates virtual object corresponding to a source code of a user and performs synchronization between the created virtual object and a real object 140 to control the real object 140 through a virtual environment. For example, the object synchronization apparatus 100 may create the virtual object corresponding to the source code of the user in a virtual space, in response to a compiling request based on the source code to control the real object 140 by means of control of the virtual object created in the virtual environment (e.g., the virtual space).

The object synchronization apparatus 100 may perform compiling for converting a text file (e.g., a source code) which describes a computer program in a human-readable programming language into a machine language interpretable and executable by an interpreter of the object synchronization apparatus 100. For example, the object synchronization apparatus 100 may create a virtual object to be expressed in the virtual space, based on a machine language corresponding to the source code of the user. Herein, the source code of the user may include at least one function for performing a control function such as a movement and an action of the virtual object.

The object synchronization apparatus 100 may provide the user with a scene in which there is a virtual object. For example, the scene may be composed of one or more frames indicating the virtual object and a virtual space in which the virtual object is present and created. A plurality of frames may configure consecutive images. The virtual space may indicate a two-dimensional (2D) or three-dimensional (3D) space in which there is a virtual object. For convenience of description in the specification, the virtual space is mainly described as the 3D space.

The virtual object may indicate a thing, a fluid, gas, a solid, a rigid body, a soft body, a deformable object (e.g., an object including both the rigid body and the soft body), and the like, which are formed with a set of one or more particles. For example, a position, a shape, a size, a state, and the like of each of the particles may be changed according to any movement model in a scene or a virtual space for each of the particles. Particularly, as an example in which the virtual object is the solid in the specification, the virtual object is mainly described as being able to be created in the virtual space by means of functions indicating a function associated with controlling a robot, which are written by the user.

The object synchronization apparatus 100 may express a target in a real world (e.g., the real object 140 such as the robot, hereinafter referred to as the "real object 140") as a virtual object in a virtual space. For example, the object synchronization apparatus 100 may create a virtual object corresponding to a source code in a virtual space and may express and/or provide the created virtual object to the user through the virtual space. Although described below, the user may control (e.g., advance a robot) the real object 140 by means of the virtual object.

The object synchronization apparatus 100 may perform verification for the created virtual object. For example, before controlling the real object 140, the object synchronization apparatus 100 may perform verification of whether to apply or synchronize the virtual object with the real object 140. In detail, the verification may include verification of software interworking and verification of hardware compatibility. The object synchronization apparatus 100 may apply a function associated with control of the robot (e.g., a function included in the source code), which is written by the user, to the virtual object to first verify the virtual object, thus synchronizing the virtual object with the real object 140. For reference, the object synchronization apparatus 100 may first perform verification of software interworking of the virtual object and may then perform verification about hardware compatibility. A detailed description of the verification is given below with reference to FIG. 9.

The object synchronization apparatus 100 may perform synchronization between the verified virtual object and the real object 140, in response to a control request for the verified virtual object. For example, the object synchronization apparatus 100 may perform synchronization, based on the control request, a control command, and a control command protocol. However, the synchronization process is not limited thereto. Synchronization between the virtual object and the real object 140 may be performed based on a protocol, other than the above-mentioned synchronization process.

The object synchronization apparatus 100 may create a sub-virtual object corresponding to a detected target object in the virtual space when the synchronized real object 140 detects the target object. For example, unlike the process in which the object synchronization apparatus 100 creates the virtual object corresponding to the source code of the user, the object synchronization apparatus 100 may create a sub-virtual object corresponding to a target object (e.g., a robot object, a wall object, a stair object, a road object, a human object, or the like which is different from the real object 140). Particularly, in the specification, the sub-virtual object is mainly described as being an object detected by the virtual object. However, the sub-virtual object is not limited thereto. For example, the sub-virtual object may indicate a virtual object corresponding to a source code of a user different from the above-mentioned user. Therefore, even when the sub-virtual object is not detected by the virtual object, it may be created in the virtual space.

The object synchronization apparatus 100 may create a sub-virtual object corresponding to the target object detected by the real object 140 to provide the user with an interaction between virtual objects. Particularly, the object synchronization apparatus 100 may create the sub-virtual object, thus providing the user with a target object, which is included in a space different from a space where the user is actually present (e.g., a space between a current position of the user and a different position apart from the current position of the user by a predetermined length), through the expression of the sub-virtual object.

The processor 110 may execute software and may control at least one other component (e.g., a hardware or software component) connected with the processor 110. In addition, the processor 110 may perform a variety of data processing or calculation. For example, the processor 110 may store a source code and a control request in the memory 120.

For reference, the processor 110 may perform all operations performed by the object synchronization apparatus 100. Therefore, for convenience of description in the specification, the operation performed by the object synchronization apparatus is mainly described as an operation performed by the processor 110.

The memory 120 may temporarily and/or permanently store various pieces of data and/or information required to perform object synchronization.

The interface 130 may indicate an interface capable of assisting in performing communication between the object synchronization apparatus 100 and the real object 140. In detail, the interface 130 may indicate a shared boundary for exchanging information or a signal between two different devices (e.g., the object synchronization apparatus 100 and the real object 140).

The interface 130 may provide the object synchronization apparatus 100 with a shared boundary for performing synchronization between the virtual object and the real object 140. Furthermore, the real object 140 may detect a target object and may deliver information about the target object to the object synchronization apparatus 100 through the interface 130. Finally, the object synchronization apparatus 100 may create a sub-virtual object corresponding to the detected target object in the virtual space, based on the information about the target object, which is transmitted through the interface 130.

Figure 2:
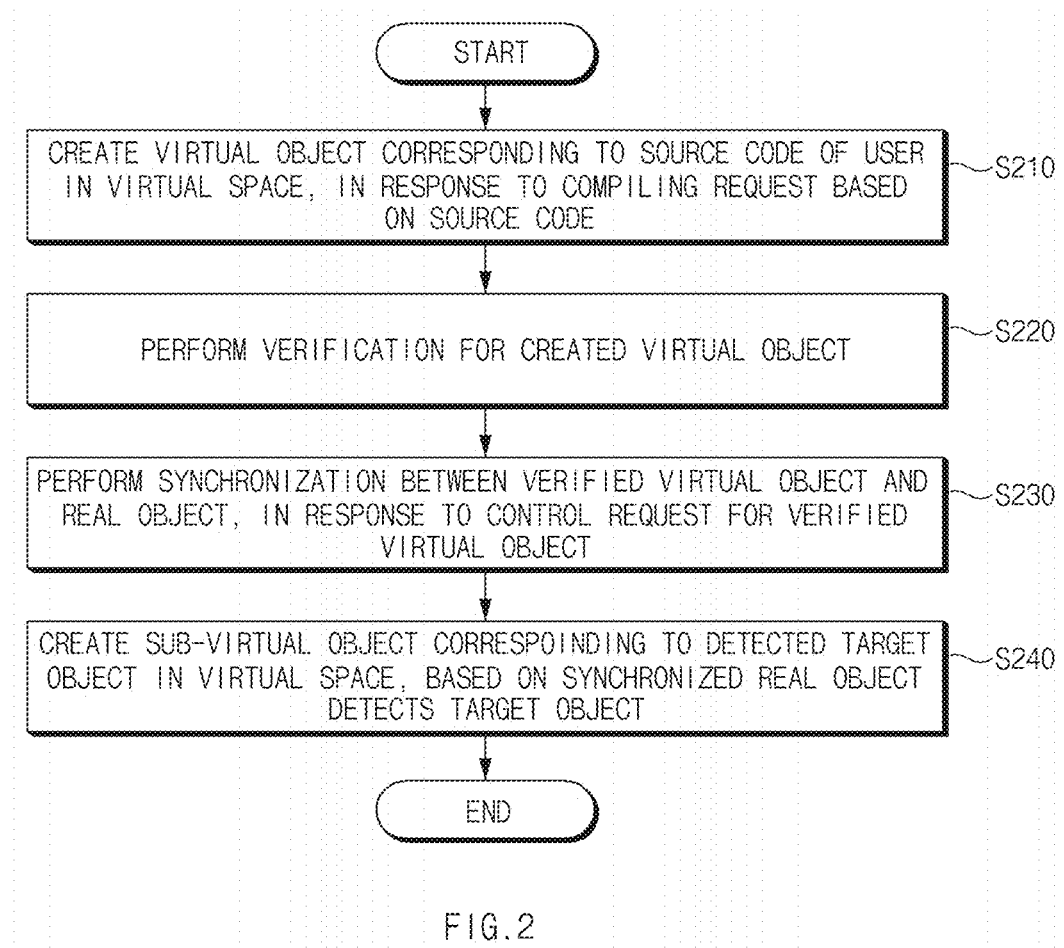
FIG. 2 is a flowchart for describing an object synchronization method according n embodiment of the present disclosure.

FIG. 2 is a flowchart for describing an object synchronization method according to an embodiment of the present disclosure.

In S210, an apparatus (e.g., an object synchronization apparatus 100 of FIG. 1) may create a virtual object corresponding to a source code of a user in a virtual space, in response to a compiling request based on the source code.

The apparatus may provide the user with a development environment. For example, the user may create a source code through a development environment of a user's personal device (e.g., a user's personal computer (PC)). However, performance (e.g., the computing speed of a central processing unit (CPU), a network speed, or the like) of the user's personal device may have a difference for each of a plurality of users. To address such a difference, the apparatus may provide the user with the same development environment.

In detail, the apparatus may provide the user with a development environment for a virtual object, thus generating the virtual object in response to the compiling request based on the source code. The apparatus may provide a user's personal device connected with an interface (e.g., an interface 130 of FIG. 1) with a development environment including the same performance and environment settings.

The apparatus may provide each of a plurality of users with an independent development environment and an independent virtual space when the user is plural in number. For example, the independent virtual space may be a space, which is paired with the independent development environment provided to each of the plurality of users, in which a virtual object is created or expressed. In detail, in the situation where the user who wants to create the virtual object by means of the apparatus is plural in number, the apparatus may provide each of the plurality of users with the independent development environment and the independent virtual space, thus generating virtual objects of the plurality of users in parallel in response to a compiling request for a plurality of source codes.

The apparatus may create a virtual object corresponding to the source code of a first user among the plurality of users in an independent virtual space of the first user and may create a virtual object corresponding to the source code of a second user different from the first user among the plurality of users in an independent virtual space of the second user. Herein, the first user and the second user may indicate different users. However, the source code of the first user and the source code of the second user are mainly described as, but not limited to, different source codes.

Furthermore, that the user is plural in number is not limited to that described above. For example, the apparatus may provide each of the plurality of users with an independent development environment and a dependent virtual space, based on the user is plural in number. For example, the dependent virtual space may be a space, which is bound to the independent development environment provided to each of the plurality of users, in which the plurality of virtual objects are created or expressed. As a result, the apparatus may provide the users with a virtual space to which an interaction between the plurality of users is applied. For example, the apparatus may create a virtual object corresponding to the source code of the first user and a virtual object corresponding to the source code of the second user in one virtual space.

In S220, the apparatus may perform verification for the created virtual object.

The apparatus may perform first verification and second verification for the created virtual object. For example, the first verification may indicate verification of software interworking for the created virtual object. Furthermore, the second verification may indicate verification of hardware compatibility for the created virtual object.

The first verification may include verification for a plurality of call functions included in the source code and verification for a movement and an action of the virtual object in the virtual space.

For example, when a source code written by the user is compiled by software integration, the software verification may be verification for software executed by a processor (e.g., a processor 110 of FIG. 1) of the apparatus. Furthermore, the source code may include the plurality of call functions, in detail, functions in which functions about the plurality of robot movements and actions are written in text according to a predetermined form. The apparatus may execute software for performing the function about the above-mentioned robot movement and action by means of compiling of the source code. Herein, the apparatus may perform verification for a syntax element and a semantic element of the text in which the function about the above-mentioned robot movement and action is written, thus perform software verification.

The apparatus may perform verification for a movement and an action of the virtual object in the virtual space. For example, the apparatus may move (e.g., control) the created virtual object in a first direction (e.g., a positive direction of the x-axis in a 3D space represented by the x-axis, y-axis, and z-axis), in a virtual space (e.g., a space on a 3D plane). Thereafter, the apparatus may move the virtual object in a second direction (e.g., a positive direction of the y-axis on the 3D space represented by the x-axis, the y-axis, and the z-axis) different from the above-mentioned first direction.

Herein, the apparatus may measure an angle between the first direction and the second direction to perform the verification for the movement and the action of the virtual object. For example, when the angle between the first direction and the second direction is different from a predetermined angle (e.g., 90 degrees), the apparatus may provide the user with information that it fails to verify the movement and the action of the virtual object.

However, the verification for the movement and the action of the virtual object is not limited thereto. For example, the apparatus may perform at least one of a movement speed of the virtual object in a specified direction, a movement of the wheel, or movements of components included in the virtual object, or any combination thereof as the verification for the movement and the action of the virtual object.

The second verification may indicate verification for compatibility of hardware components, which is associated with a movement and an action of a real object (e.g., a real object 140 of FIG. 1) to be synchronized with the virtual object. For example, the second verification may include verification for compatibility of hardware components, which is associated with at least one of power consumption of the real object, allocated amounts of a central processing unit (CPU) and a memory, or an amount of movement corresponding to the movement, or any combination thereof.

In S230, the apparatus may perform synchronization between the verified virtual object and the real object, in response to a control request for the verified virtual object.

The apparatus may change the virtual object to a control mode in response to the control request of the user for the synchronization between the virtual object and the real object. For example, the mode of the virtual object may include a waiting mode, a control mode, and an error mode.

The waiting mode may include a waiting state in which the virtual object waits in the virtual space from a time point when the virtual object is created to a time point when the control request of the user is received. Particularly, the waiting mode may include a mode in which the waiting state of the virtual object for the control request of the user is maintained. A description of the waiting state and the waiting mode of the virtual object for the control request of the user are given below.

The control mode may include a state in which the virtual object is controlled in the virtual space from a time point when the control request of the user is received to a time point when the control of the virtual object is ended.

The error mode may include a state in which it is impossible to control the virtual object due to an error of the virtual object from a time point when the virtual object is created to a time point when the control of the virtual object is ended.

The apparatus may create a control command protocol capable of controlling a real object, depending on a control command for the virtual object of the user. The control command protocol may include an instruction about a specified format and protocol to transmit the control command of the user to the real object and execute the control command on the real object side.

The apparatus may apply the control command protocol to the real object, thus performing synchronization between the virtual object and the real object. For example, the apparatus may synchronize a state of the virtual object with a state of the real object by means of the synchronization between the virtual object and the real object. Furthermore, the apparatus may limit access to shared data between the virtual object and the real object by means of the synchronization between the virtual object and the real object. Furthermore, the apparatus may prevent deadlock of the virtual object and the real object by means of the synchronization between the virtual object and the real object.

The apparatus may provide the user with a control approval notification for the control request when the synchronization is performed. When receiving the control approval notification from the apparatus, the user may control the virtual object to control the real object synchronized with the virtual object.

The apparatus may perform synchronization between the plurality of virtual objects and the real object in response to the control request for the plurality of virtual objects. For example, the apparatus may change the virtual object of the first user to the control mode, in response to the control request for the virtual object of the first user. While changing the virtual object of the first user to the control mode, the apparatus may receive a control request for the virtual object of the second user. When receiving the control request of the second user while changing the virtual object of the first user to the control mode, the apparatus may set the control request of the second user to the waiting mode.

The apparatus may separate and synchronize the control request of the first user and the control request of the second user for one real object. For example, after changing the virtual object of the first user to the control mode, the apparatus may change the virtual object of the second user to the control mode. However, the synchronization method for the control requests of the plurality of users is not limited thereto. For example, after the control mode of the virtual object of the first user is ended, the apparatus may change the waiting mode of the virtual object of the second user to the control mode. Herein, the virtual object of the first user and the virtual object of the second user may be the same virtual objects.

In S240, the apparatus may create a sub-virtual object corresponding to a detected target object in the virtual space when the synchronized real object detects the target object.

When the detected target object is a robot object (hereinafter referred to as a "robot") different from the real object, the apparatus may perform verification for a movement and an action of the sub-virtual object. For example, when the target object is the robot, the apparatus may create a sub-virtual object (e.g., a robot in the virtual space) corresponding to the target object (e.g., the robot in a real-world space). The apparatus may express and create a movement and an action of the target object in the virtual space by means of the verification for the movement and the action of the created sub-virtual object.

However, the verification of the sub-virtual object is not limited thereto. For example, the verification of the sub-virtual object may include verification for an interaction with a virtual space previously created in the virtual space, as well as the verification for the movement and the action. In detail, the verification for the interaction may include verification for a distance between the sub-virtual object and the virtual object and verification for a movement line between the sub-virtual object and the virtual object.

Figure 3:
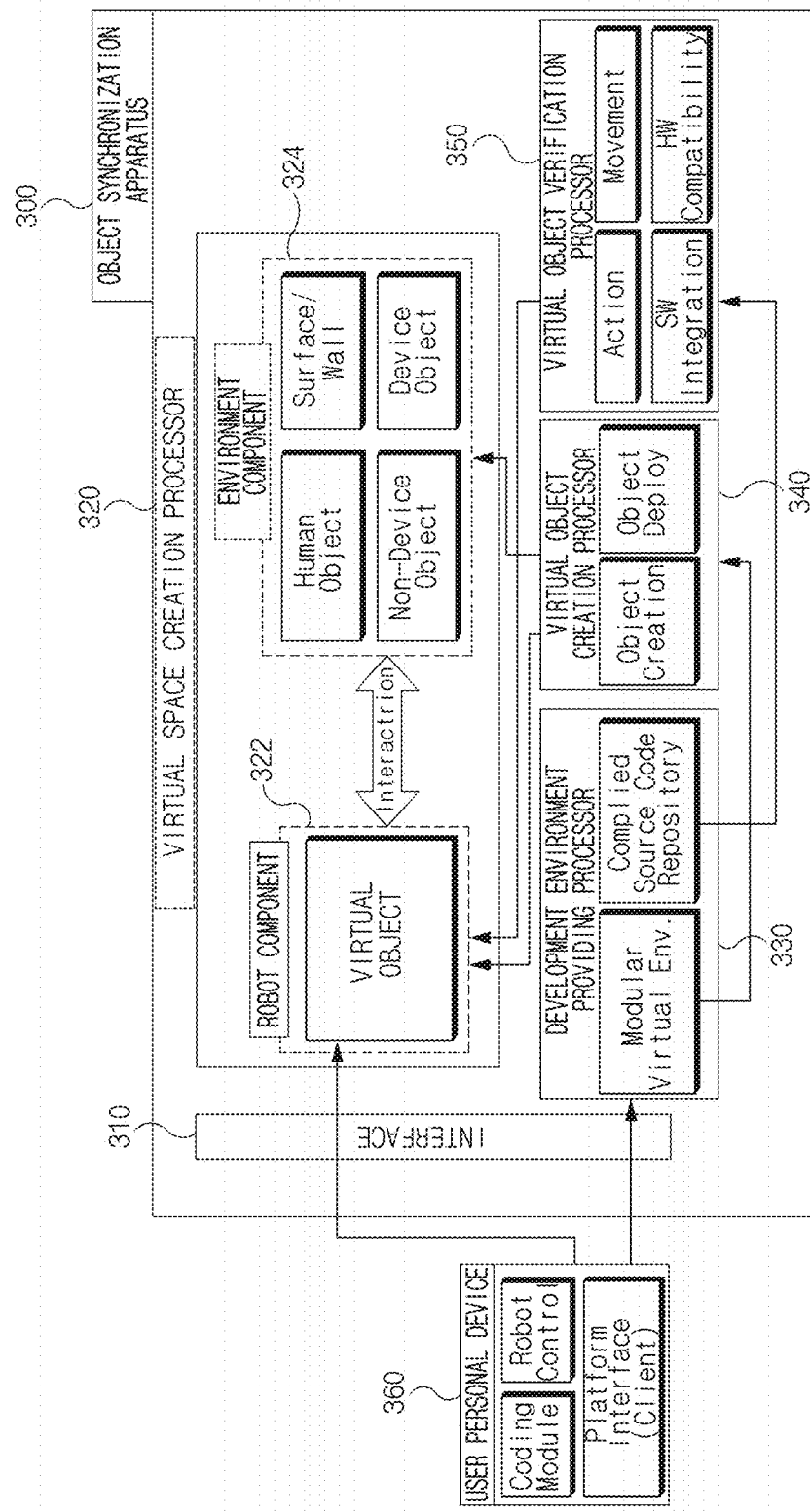
FIG. 3 is a drawing illustrating a connection between an object synchronization apparatus and a user's personal device according to an embodiment of the present disclosure.

FIG. 3 is a drawing illustrating a connection between an object synchronization apparatus and a user's personal device according to an embodiment of the present disclosure.

An apparatus 300 may include at least one processor that accesses a memory (e.g., a memory 120 of FIG. 1) and executes instructions (e.g., instructions 122 of FIG. 1). For example, the apparatus 300 may include a virtual space creation processor 320, a development environment providing processor 330, a virtual object creation processor 340, and a virtual object verification processor 350.

For example, the apparatus 300 may be connected with a user's personal device 360 through an interface 310. The apparatus 300 may allow a user to access the virtual space creation processor 320 and access the development environment providing processor 330 through the interface 310.

The virtual space creation processor 320 may create a robot component 322 and an environment component 324. For example, the robot component 322 may include a virtual object and may include a virtual object corresponding to a source code of the user and a sub-virtual object corresponding to a detected target object.

The environment component 324 may include a human object, a wall object, a non-device object, and a device object. The human object, the wall object, the non-device object, and the device object may correspond to a person, a wall, a non-device, and a device, respectively.

The apparatus 300 may express and create an interaction between the robot component 322 and the environment component 324 by means of the virtual space creation processor 320. In detail, the apparatus 300 may express the interaction between the robot component 322 and the environment component 324 in a virtual space created by the virtual space creation processor 320 by means of the user's personal device 360 through the interface 310.

The interaction may include a relationship between the robot component 322 and the environment component 324. For example, when the robot component 322 bumps into a wall object included in the environment component 324 in the virtual space, the interaction may include an action in which the state of the robot component 322 is changed by the environment component 324.

The development environment providing processor 330 may provide a modular virtual environment (env.) and a complied source code repository. For example, the modular virtual environment (env.) may indicate a module that creates and manages a virtual environment, and the complied source code repository may include a source code that is not compiled and source codes that are compiled by a compiling request of the user.

The virtual object creation processor 340 may create a virtual object, based on the source code included in the compiled source code repository. For example, the virtual object creation processor 340 may create a virtual object and may deploy the created virtual object. Particularly, the virtual object creation processor 340 may create and deploy an object included in the robot component 322 and an object included in the environment component 324 in the virtual space.

The virtual object verification processor 350 may perform verification for the virtual object created by the virtual object creation processor 340. For example, the virtual object verification processor 350 may perform software (SW) integration for a plurality of call functions included in the source code of the virtual object, verification for a movement and an action of the virtual object in the virtual space, and verification for hardware (HW) compatibility of hardware components, which is associated with a movement and an action of a real object to be synchronized with the virtual object.

The user's personal device 360 may include a coding module, a robot control module, and a platform interface. The coding module may be a module in which a source code for a virtual object to be created by the virtual space creation processor 320 is compiled or operated. The robot control module may be a module for controlling the real object synchronized with the virtual object. The platform interface may be an interface for communication of the apparatus 300 with the user's personal device 360.

Figure 4:
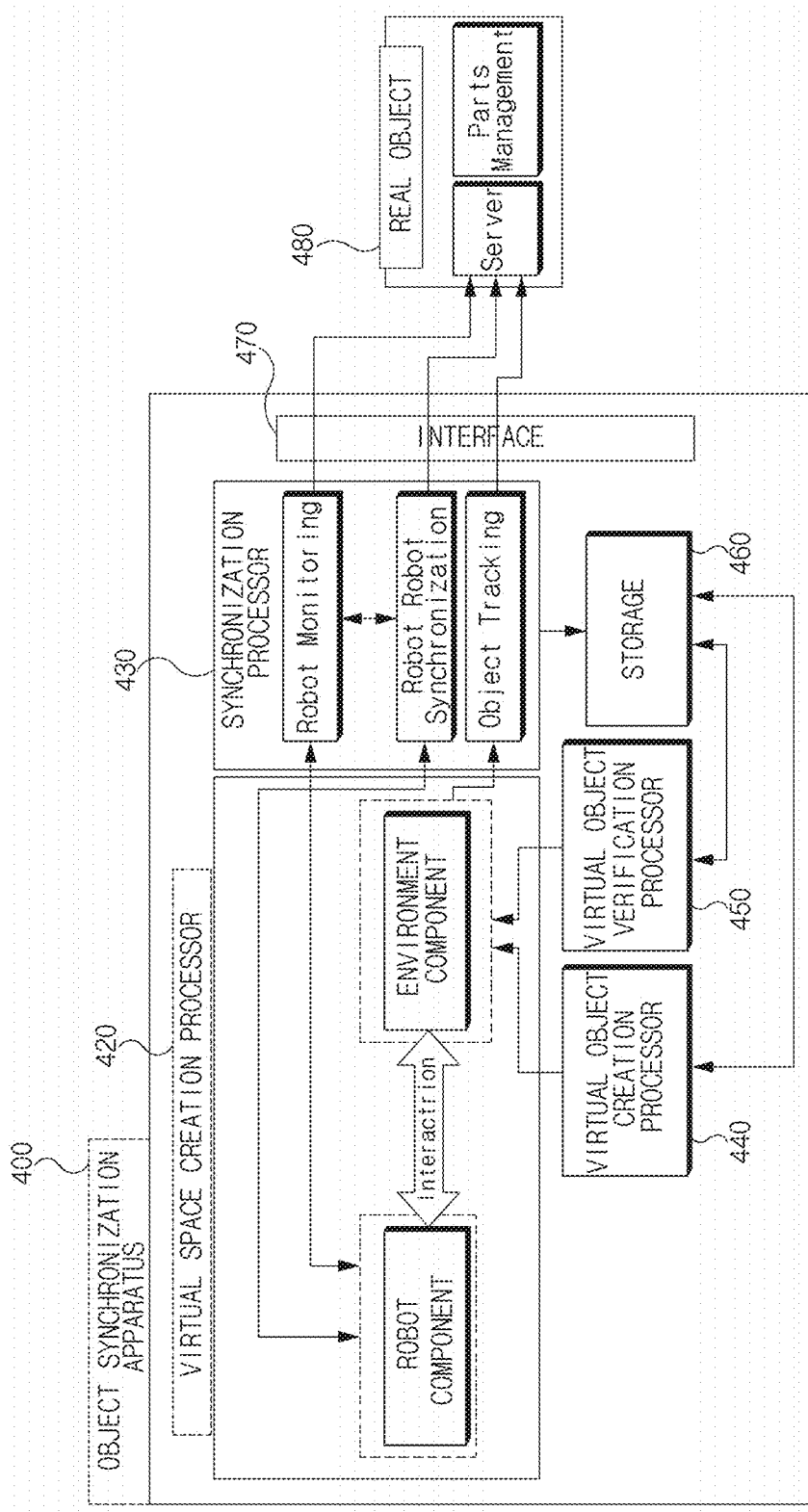
FIG. 4 is a drawing illustrating a connection between an object synchronization apparatus and a real object according to an embodiment of the present disclosure.

FIG. 4 is a drawing illustrating a connection between an object synchronization apparatus and a real object according to an embodiment of the present disclosure.

An apparatus 400 may include at least one processor that accesses a memory (e.g., a memory 120 of FIG. 1) and executes instructions (e.g., instructions 122 of FIG. 1). For example, the apparatus 400 may include a virtual space creation processor 420, a synchronization processor 430, a virtual object creation processor 440, and a virtual object verification processor 450.

For reference, the virtual space creation processor 420 may correspond to a virtual space creation processor (e.g., a virtual space creation processor 320 of FIG. 3). An interface 470 may correspond to an interface (e.g., an interface 310 of FIG. 3). A virtual object creation processor 440 may correspond to a virtual object creation processor (e.g., a virtual object creation processor 340 of FIG. 3). The virtual object verification processor 450 may correspond to a virtual object verification processor (e.g., a virtual object verification processor 350 of FIG. 3).

A real object 480 may include a server and parts management. The server of the real object 480 may indicate a server capable of performing communication with the apparatus 400. The parts management of the real object 480 may indicate a module that controls a component (e.g., a robotic arm) of the real object 480. The apparatus 400 may access the server and the parts management of the real object 480 through the interface 470.

The synchronization processor 430 may perform robot monitoring, robot synchronization, and object tracking. For example, the robot monitoring may indicate monitoring of a state of the real object 480. The robot synchronization may indicate synchronization between a robot component of the virtual space created by the virtual space creation processor 420 and the real object 480, after the monitoring of the state of the real object 480. The apparatus 400 may store information generated by the synchronization processor 430 (e.g., the state of the real object 480) in storage 460. For reference, the object tracking is described below with reference to FIG. 6.

Figure 5:
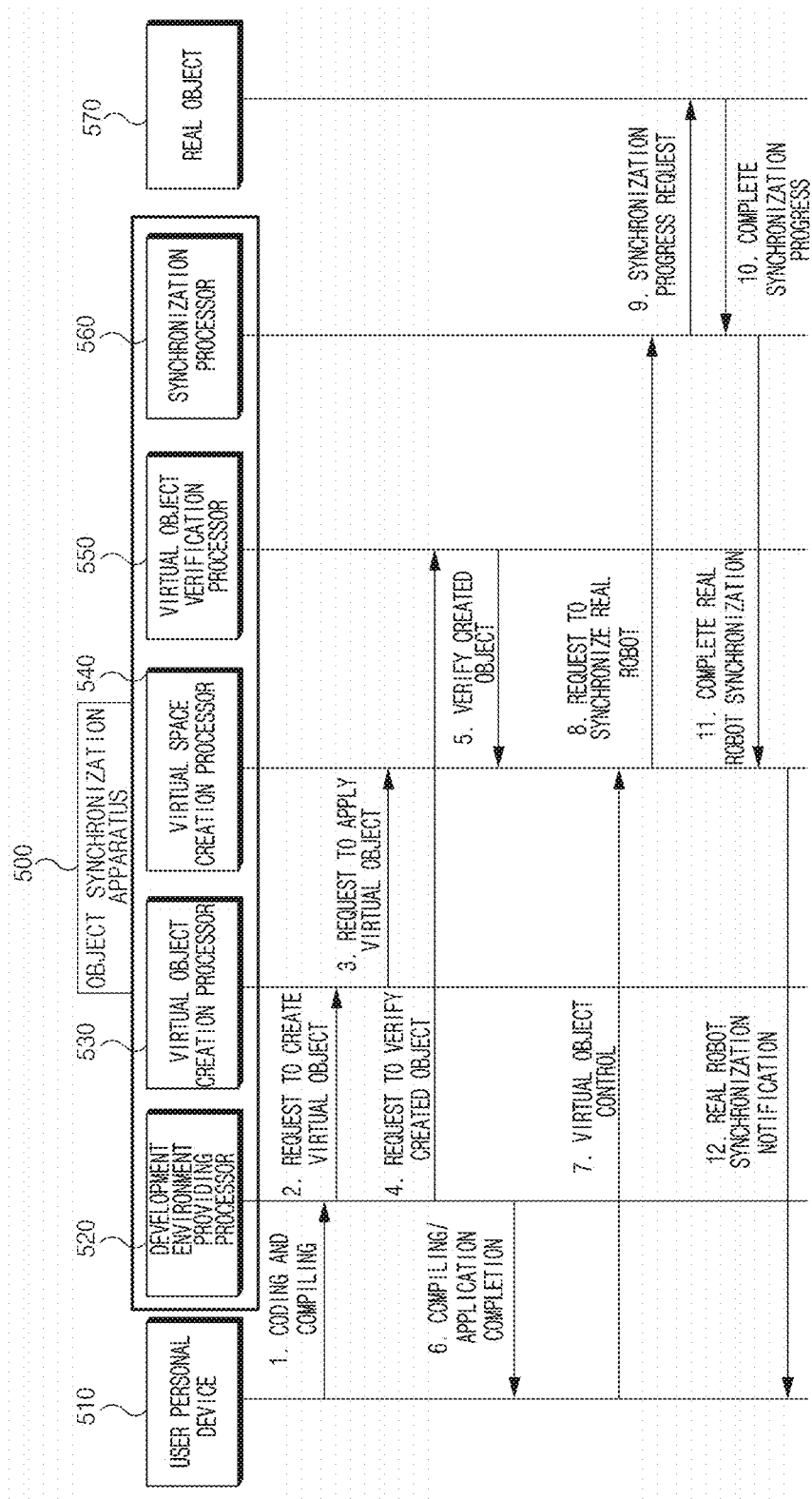
FIG. 5 is a drawing illustrating a method for performing synchronization between a virtual object and a real object in an object synchronization apparatus according to an embodiment of the present disclosure.

FIG. 5 is a drawing illustrating a method for performing synchronization between a virtual object and a real object in an object synchronization apparatus according to an embodiment of the present disclosure.

A user's personal device 510 may transmit a request for coding and compiling of a source code to an object synchronization apparatus 500. In detail, the user's personal device 510 may transmit the request for the coding and compiling of the source code to a development environment providing processor 520. The development environment providing processor 520 may request a virtual object creation processor 530 to create a virtual object, in response to the request of a user. The virtual space creation processor 540 may create a virtual space, in response to the request to create the virtual object and may express a virtual object to be deployed in the created virtual space.

When the virtual object is created, the development environment providing processor 520 may request a virtual object verification processor 550 to verify the created object. The virtual object verification processor 550 may perform verification for the virtual object created in the virtual space, in response to the request to verify the created object. Thereafter, the virtual object verification processor 550 may transmit information about compiling completion and virtual object creation completion to the user's personal device 510.

The object synchronization apparatus 500 may perform synchronization between the virtual object and a real object 570, in response to a virtual object control request of the user's personal device 510. For example, the synchronization processor 560 may transmit a synchronization progress request to the real object 570 In detail, the synchronization processor 560 may change the virtual object to a control mode, may create a control command protocol capable of controlling the real object 570, and may apply the control command protocol to the real object 570.

The object synchronization apparatus 500 may provide the user's personal device 510 with a synchronization notification for a control request (e.g., a synchronization request) and a control approval notification when the synchronization between the virtual object and the real object 570 is performed.

Figure 6:
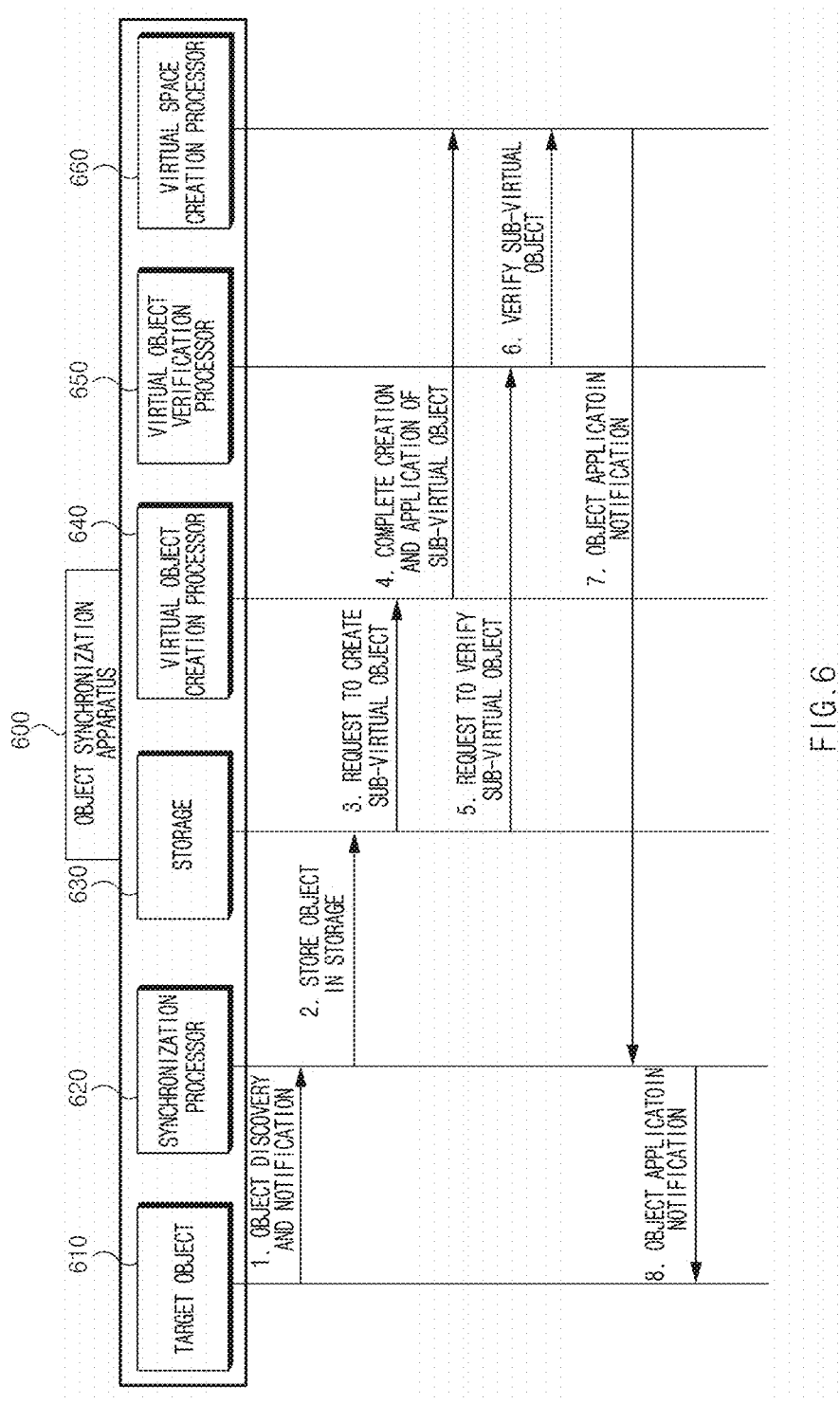
FIG. 6 is a drawing illustrating a method for performing synchronization between a detected target object and a sub-virtual object in an object synchronization apparatus according to an embodiment of the present disclosure.

FIG. 6 is a drawing illustrating a method for performing synchronization between a detected target object and a sub-virtual object in an object synchronization apparatus according to an embodiment of the present disclosure.

When a target object 610 is detected by a real object (e.g., a real object 570 of FIG. 5), an object synchronization apparatus 600 may deliver an object discovery and notification to a synchronization processor 620. Thereafter, the synchronization processor 620 may store information about the target object 610 in storage 630 and may request a virtual object creation processor 640 to create a virtual object (e.g., a sub-virtual object) about the target object 610.

The virtual object creation processor 640 may create a sub-virtual object corresponding to the target object 610, based on the above-mentioned request, and may apply the sub-virtual object to a virtual space. Thereafter, the object synchronization apparatus 600 may request a virtual object verification processor 650 to verify the sub-virtual object about the target object 610, based on the information about the target object 610, which is stored in the storage 630.

The virtual object verification processor 650 may perform verification for the created sub-virtual object, in a virtual space created by a virtual space creation processor 660. Herein, the verification for the sub-virtual object may be first verification including software verification, verification for a movement, and verification for an action. When the verification of the sub-virtual object about the target object 610 is completed, the object synchronization apparatus 600 may transmit a target object application notification to a user (e.g., a user's personal device 510 of FIG. 5).

The object synchronization apparatus 600 may track a state of the detected target object 610. For example, the object synchronization apparatus 600 may track at least one of a position state of the target object 610, or a hardware state, or any combination thereof. Herein, the object synchronization apparatus 600 may update the state of the target object 610, when the state of the target object 610 is changed, by means of the tracked result. The object synchronization apparatus 600 may perform synchronization between the updated target object and the sub-virtual object when the state of the detected target object 610 is updated. In detail, the synchronization processor 620 may perform synchronization between the updated target object and the sub-virtual object.

Figure 7:
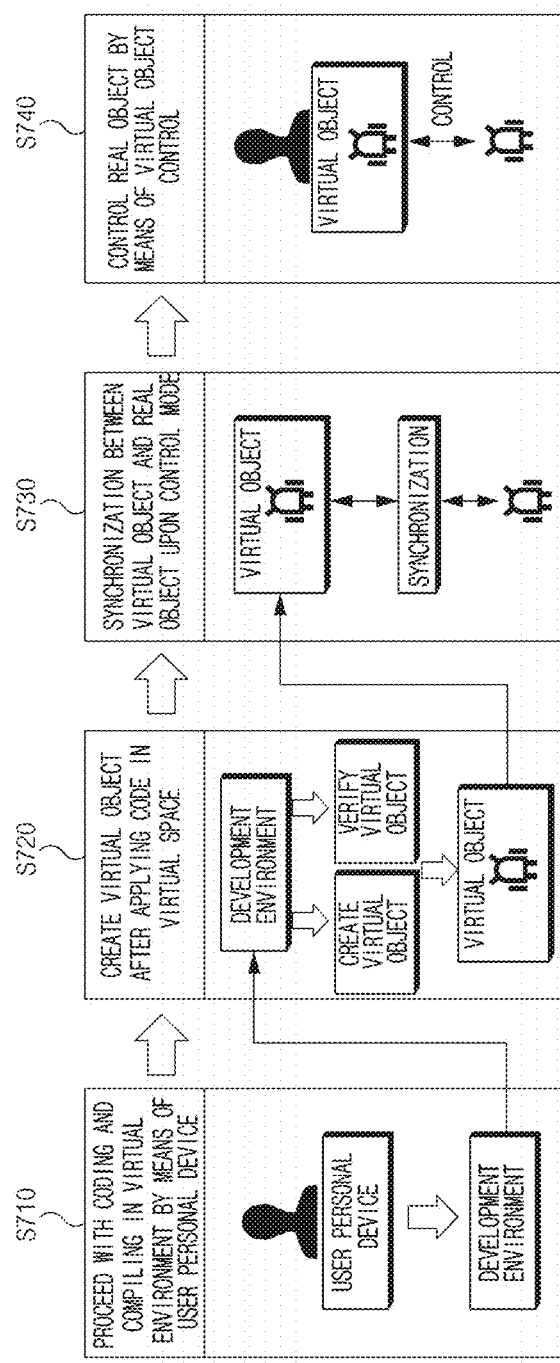
FIG. 7 is a drawing illustrating a connection between an object synchronization apparatus and a user's personal device according to an embodiment of the present disclosure.

FIG. 7 is a drawing illustrating a connection between an object synchronization apparatus and a user's personal device according to an embodiment of the present disclosure.

In S710, an apparatus (e.g., an object synchronization apparatus 100 of FIG. 1) may provide a user's personal device with a virtual environment and may perform compiling of a source code coded in the provided virtual environment. For example, the apparatus may provide a user with the same development environment as a development environment included in the user's personal device.

In S720, the apparatus may create a virtual object corresponding to a source code input to the development environment by the user. The apparatus may perform verification of the created virtual object. Herein, the verification may include first verification including software verification, verification for a movement, and verification for an action and second verification including verification for compatibility of hardware components, which is associated with the power consumption of a real object, the allocated amounts of a CPU and a memory, and the amount of movement corresponding to a movement.

In S730, the apparatus may perform synchronization between the verified virtual object and the real object in response to a control request for the verified virtual object. For example, the apparatus may change the virtual object to a control mode, in response to a control request of the user, may create a control command protocol capable of controlling the real object, and may apply the control command protocol to the real object, thus performing synchronization. The apparatus may provide the user with a control approval notification for the control request when the synchronization is performed.

In S740, the apparatus may apply a control command of the user to the real object. For example, the user may deliver a control request about a command to move the real object to the apparatus. The apparatus may apply the control request of the user to the virtual object, thus providing the user with the virtual object to which the control request is applied. Simultaneously, the apparatus may perform synchronization between the virtual object to which the control request is applied and the real object. The real object may perform the control request of the user when the synchronization performed by the apparatus.

Figure 8:
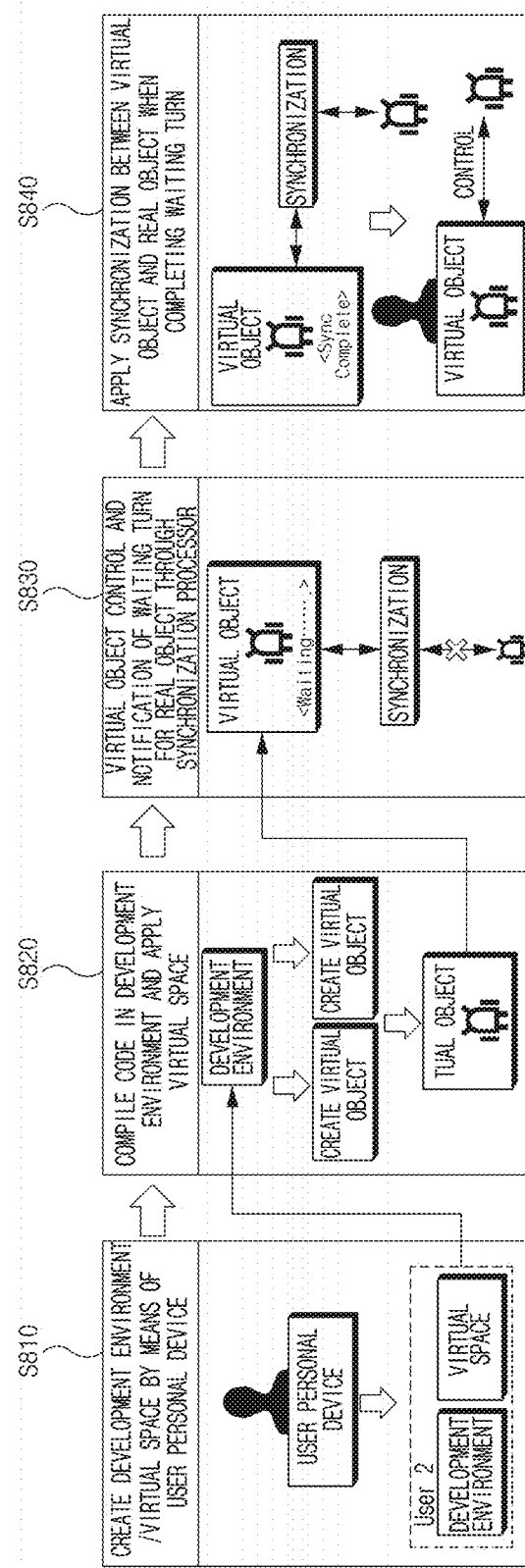
FIG. 8 is a drawing illustrating a connection between an object synchronization apparatus and a plurality of user personal devices according to an embodiment of the present disclosure.

FIG. 8 is a drawing illustrating a connection between an object synchronization apparatus and a plurality of user's personal devices according to an embodiment of the present disclosure.

In S810, an apparatus (e.g., an object synchronization apparatus 100 of FIG. 1) may provide each of a plurality of users with an independent environment and an independent virtual space, based on that a user is plural in number. For example, the apparatus may provide a user (e.g., a user illustrated as "User 2" in FIG. 8, hereinafter referred to as a "second user") different from a user (e.g., a user of FIG. 7, hereinafter referred to as a "first user") with a development environment different from a development environment of the first user.

In S820, the apparatus may create a virtual object corresponding to a source code of the first user among the plurality of users in an independent virtual space of the first user and may create a virtual object corresponding to a source code of the second user among the plurality of users in an independent virtual space of the second user. Hereinafter, for convenience of description in FIG. 8, an example of the second user is mainly described.

In S830, when there is a control request for a virtual object of the second user while changing a virtual object of the first user to a control mode, the apparatus may set a control request of the second user to a waiting mode. For example, the apparatus may set the control request of the second user to the waiting mode and may provide a waiting turn for real object synchronization.

In S840, after changing the virtual object of the first user to the control mode, the apparatus may change the virtual object of the second user to the control mode. For example, the apparatus may apply a control command of the second user to a real object. The apparatus may apply the control request of the second user to the virtual object corresponding to the source code of the second user, thus providing the second user with the virtual object to which the control request is applied. Simultaneously, the apparatus may perform synchronization between the virtual object to which the control request of the second user is applied and the real object. The real object may perform the control request of the second user when the synchronization performed by the apparatus.

Figure 9:
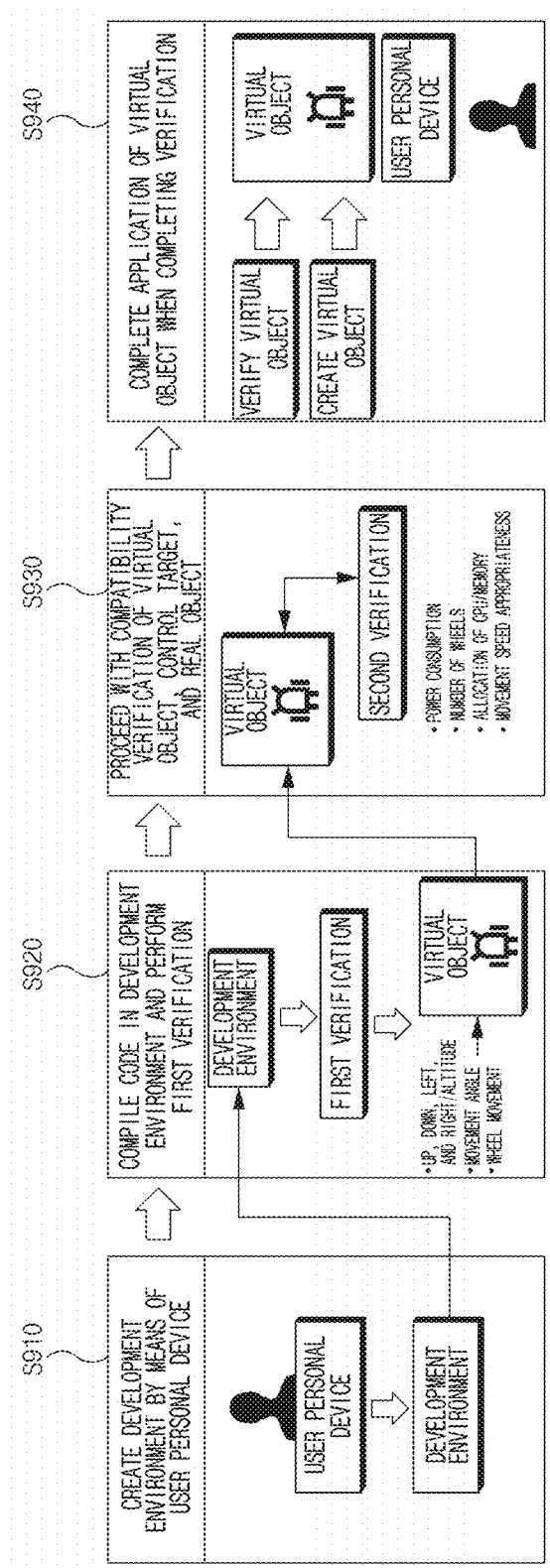
FIG. 9 is a drawing illustrating a method for verifying a virtual object and applying the verified virtual object to a real object in an object synchronization apparatus according to an embodiment of the present disclosure.

FIG. 9 is a drawing illustrating a method for verifying a virtual object and applying the verified virtual object to a real object in an object synchronization apparatus according to an embodiment of the present disclosure.

In S910, an apparatus (e.g., an object synchronization apparatus 100 of FIG. 1) may proceed with coding and compiling in a virtual environment by means of a user's personal device. Herein, a development environment included in the user's personal device may be the same as a development environment of the apparatus.

In S920, the apparatus may perform first verification for a created virtual object. For example, the first verification may indicate verification of software interworking for the created virtual object. In detail, the first verification may include software verification for a plurality of call functions included in a source code and verification for a movement and an action of the virtual object in a virtual space.

In S930, the apparatus may perform second verification when the first verification for the virtual object is performed. For example, the second verification may include verification for compatibility of hardware components, which is associated with at least one of power consumption of a real object, allocated amounts of a CPU and a memory, an amount of movement corresponding to a movement, or the number of wheels of the virtual object and the number of wheels of the real object, or any combination thereof.

In S940, the apparatus may deliver, create, and verify complete information of the virtual object to the user, when the verification (e.g., the first verification and the second verification) for the virtual object is completed. When receiving the creation and verification complete information of the virtual object from the apparatus, the user may control the virtual object. In detail, the user may deliver a control request for the virtual object to the apparatus, thus controlling the virtual object changed to a control mode.

Figure 10:
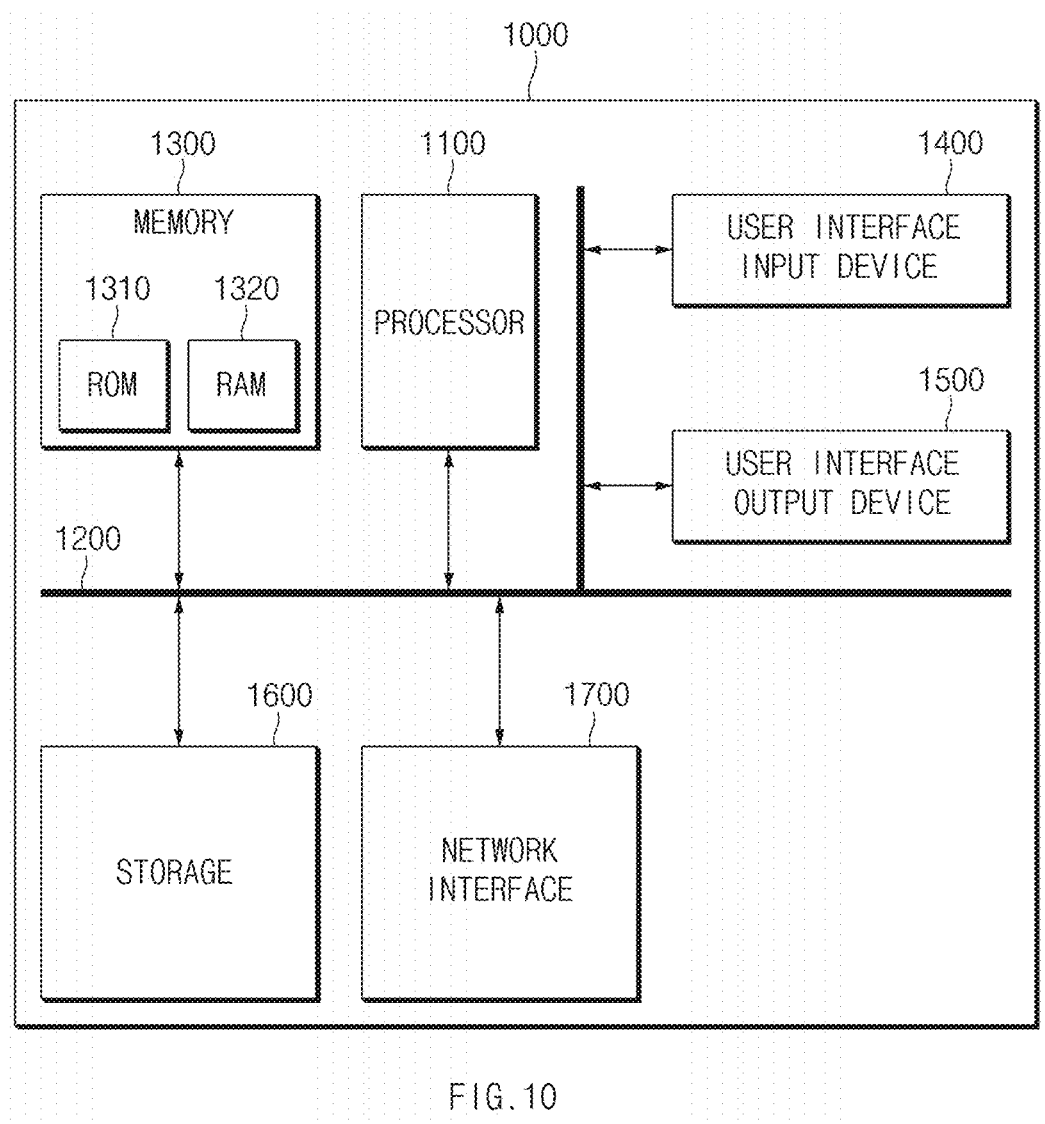
FIG. 10 illustrates a computing system about an object synchronization method according to an embodiment of the present disclosure.

FIG. 10 illustrates a computing system about an object synchronization method according n embodiment of the present disclosure.

Referring to FIG. 10, a computing system 1000 for the object synchronization method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read-only Memory) 1310 and a RAM (Random-access Memory) 1320.

Accordingly, the operations of the method or algorithm described in connection with the embodiments disclosed in the specification may be directly implemented with a hardware module, a software module, or a combination thereof, which is executed by the processor 1100. The software module may reside on a storage medium (i.e., the memory 1300 and/or the storage 1600) such as a RAM, a flash memory, a ROM, an erasable programmable ROM (EPROM), an electrically erasable programmable ROM (EEPROM), a register, a hard disc, a removable disk, and a compact-disc ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application-specific integrated circuit (ASIC). The ASIC may reside within a user terminal. In another case, the processor and the storage medium may reside in the user terminal as separate components.

Hereinabove, although the present disclosure has been described with reference to embodiments and the accompanying drawings, the present disclosure is not limited thereto. The embodiments of the present disclosure may be variously modified and altered by those of ordinary skill in the art to which the present disclosure pertains without departing from the spirit and scope of the present disclosure claimed in the following claims.

The above-described embodiments may be implemented with hardware components, software components, and/or a combination thereof. For example, the devices, methods, and components described in the disclosed embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process, and generate data in response to the execution of software. It should be understood by those of ordinary skill in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions, or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units, or transmitted signal waves to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to embodiments may be implemented in the form of program instructions which may be executed through various computer means and may be recorded in computer-readable media. The computer-readable media may include program instructions, data files, data structures, and the like alone or in combination. The program instructions recorded on the media may be specially designed and configured for an example or may be known and usable to those of ordinary skill in the art of computer software. Examples of computer-readable media include magnetic media such as hard disks, floppy disks, and magnetic tape; optical media such as compact disc-read only disks and digital versatile discs (DVDs); memory (CD-ROM) magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher-level codes that may be executed by the computer using an interpreter.

The above-described hardware devices may be configured to act as one or a plurality of software modules to perform the operations of the disclosed embodiments, or vice versa.

Even though the disclosed embodiments are described with reference to various drawings, it should be apparent to one of ordinary skill in the art that the disclosed embodiments may be variously changed or modified based on the above description. For example, adequate effects may be achieved even if the foregoing processes and methods are carried out in a different order than described above, and/or the aforementioned components, such as systems, structures, devices, or circuits, are combined or coupled in different forms and modes than as described above or be substituted or switched with other components or equivalents.

A description is given of the effects of the object synchronization apparatus and the method thereof according to an embodiment of the present disclosure.

According to at least one of the embodiments of the present disclosure, the object synchronization apparatus may simplify a process in which users apply and test a source code to a real object using a cable, by means of verification for a virtual object corresponding to the source code of the user, in response to a compiling request based on the source code.

Furthermore, according to at least one of the disclosed embodiments of the present disclosure, the object synchronization apparatus may allow a plurality of users to participate in robot coding education using a metaverse space, through a waiting mode and a control mode before performing synchronization between the verified virtual object and the real object, in response to the control request for the virtual object.

Furthermore, according to at least one of the disclosed embodiments of present the disclosure, the object synchronization apparatus may update a state of a detected target object in a virtual space and may allow the user to visualize a space where there is a real object through a virtual space without directly identifying the space, by means of synchronization between the updated target object and a sub-virtual object.

In addition, various effects ascertained directly or indirectly through the present disclosure may be provided.

Therefore, other implementations, other embodiments, and equivalents to the claims are within the scope of the following claims.

Therefore, embodiments of the present disclosure are not intended to limit the technical spirit of the present disclosure but are provided only for illustrative purpose. The scope of the present disclosure should be construed based on the accompanying claims, and all the technical ideas within the scope equivalent to the claims should be included in the scope of the present disclosure.

What is claimed is:

1. An object synchronization apparatus, comprising:
a memory storing computer-executable instructions; and
at least one processor configured to access the memory and execute the instructions,
wherein the at least one processor
creates a virtual object corresponding to a source code of a user in a virtual space, in response to a compiling request based on the source code,
performs verification for the created virtual object,
performs synchronization between the verified virtual object and a real object, in response to a control request for the verified virtual object, and
creates a sub-virtual object corresponding to a detected target object in the virtual space when the synchronized real object detects the target object.

2. The object synchronization apparatus of claim 1, wherein the at least one processor provides the user with a development environment for a virtual object to be created in the virtual space and creates the virtual object corresponding to the source code input to the development environment by the user.

3. The object synchronization apparatus of claim 2, wherein the at least one processor:
provides each of a plurality of users with an independent development environment and an independent virtual space when the user is plural in number;
creates a virtual object corresponding to a source code of a first user among the plurality of users in an independent virtual space of the first user; and
creates a virtual object corresponding to a source code of a second user different from the first user among the plurality of users in an independent virtual space of the second user.

4. The object synchronization apparatus of claim 1, wherein the at least one processor:
performs software verification for a plurality of call functions included in the source code;
performs a first verification for a movement and an action of the virtual object in the virtual space; and
performs a second verification compatibility of hardware components, the compatibility being associated with a movement and an action of the real object to be synchronized with the virtual object.

5. The object synchronization apparatus of claim 4, wherein the at least one processor performs verification for at least one of a movement in a first direction of the virtual object in the virtual space, a movement in a second direction different from the first direction, or an angle between the first direction and the second direction, or any combination thereof.

6. The object synchronization apparatus of claim 4, wherein:
the at least one processor performs the second verification different from the first verification including the software verification, the verification for the movement, and the verification for the action when the first verification is performed; and
the second verification includes verification for compatibility of hardware components, the compatibility being associated with at least one of power consumption of the real object, allocated amounts of a central processing unit (CPU) and a memory, or an amount of movement corresponding to the movement, or any combination thereof.

7. The object synchronization apparatus of claim 1, wherein the at least one processor:
changes the virtual object to a control mode, in response to a control request of the user;
creates a control command protocol capable of controlling the real object, depending on a control command for the virtual object of the user;
performs the synchronization by applying the control command protocol to the real object; and
provides the user with a control approval notification for the control request when the synchronization is performed.

8. The object synchronization apparatus of claim 3, wherein the at least one processor:
sets a control request of the second user to a waiting mode, when there is a control request for a virtual object of the second user while changing a virtual object of the first user to a control mode in response to a control request for the virtual object of the first user; and
changes the virtual object of the second user to the control mode, after changing the virtual object of the first user to the control mode.

9. The object synchronization apparatus of claim 1, wherein the at least one processor performs verification for a movement and an action of the sub-virtual object, based on the detected target object is a robot object different from the real object.

10. The object synchronization apparatus of claim 1, wherein the at least one processor tracks a state of the detected target object and performs synchronization between an updated target object and the sub-virtual object, based on the state of the detected target object is updated.

11. An object synchronization method, comprising:
creating a virtual object corresponding to a source code of a user in a virtual space, in response to a compiling request based on the source code;
performing verification for the created virtual object;
performing synchronization between the verified virtual object and a real object, in response to a control request for the verified virtual object; and
creating a sub-virtual object corresponding to a detected target object in the virtual space when the synchronized real object detects the target object.

12. The object synchronization method of claim 11, wherein creating the virtual object includes:
providing the user with a development environment for a virtual object to be created in the virtual space; and
creating the virtual object corresponding to the source code input to the development environment by the user.

13. The object synchronization method of claim 12, further comprises:
providing each of a plurality of users with an independent development environment and an independent virtual space when the user is plural in number;
creating a first virtual object corresponding to a source code of a first user among the plurality of users in an independent virtual space of the first user; and
creating a second virtual object corresponding to a source code of a second user different from the first user among the plurality of users in an independent virtual space of the second user.

14. The object synchronization method of claim 11, wherein performing the verification includes:
performing software verification for a plurality of call functions included in the source code;
performing verification for a movement and an action of the virtual object in the virtual space; and
performing verification for compatibility of hardware components, the compatibility being associated with a movement and an action of the real object to be synchronized with the virtual object.

15. The object synchronization method of claim 14, wherein performing the verification for the movement and the action includes:
performing verification for at least one of a movement in a first direction of the virtual object in the virtual space, a movement in a second direction different from the first direction, or an angle between the first direction and the second direction, or any combination thereof.

16. The object synchronization method of claim 14, wherein performing the verification for the compatibility of the hardware components includes:
performing a second verification different from a first verification including the software verification, the verification for the movement, and the verification for the action when the first verification is performed, and
wherein the second verification includes a verification for compatibility of hardware components, the compatibility being associated with at least one of power consumption of the real object, allocated amounts of a central processing unit (CPU) and a memory, or an amount of movement corresponding to the movement, or any combination thereof.

17. The object synchronization method of claim 11, wherein performing the synchronization includes:
changing the virtual object to a control mode, in response to a control request of the user;
creating a control command protocol capable of controlling the real object, depending on a control command for the virtual object of the user;
performing the synchronization by applying the control command protocol to the real object; and
providing the user with a control approval notification for the control request when the synchronization is performed.

18. The object synchronization method of claim 13, wherein changing the virtual object to the control mode includes:
setting a control request of the second user to a waiting mode, when there is a control request for a virtual object of the second user while changing a virtual object of the first user to a control mode in response to a control request for the virtual object of the first user; and
changing the virtual object of the second user to the control mode, after changing the virtual object of the first user to the control mode.

19. The object synchronization method of claim 11, further comprising:
  performing verification for a movement and an action of the sub-virtual object, based on the detected target object is a robot object different from the real object.

20. The object synchronization method of claim 11, further comprising:
  tracking a state of the detected target object; and
  performing synchronization between an updated target object and the sub-virtual object, based on the state of the detected target object is updated.

* * * * *